Ralph L. Jaeschke,
Inventor.
Haynes and Koenig,
Attorneys.

Patented Oct. 28, 1952

2,615,945

UNITED STATES PATENT OFFICE 2,615,945

FIELD CONTROL OF ELECTROMAGNETIC COUPLINGS

Ralph L. Jaeschke, Kenosha, Wis., assignor to Dynamatic Corporation, Kenosha, Wis., a corporation of Delaware Application September 20, 1950, Serial No. 185,894

1 Claim. (Cl. 172—284)

This invention relates to controls for magnetic couplings, and more particularly, to a control circuit for couplings of the type in which flowable magnetic material is employed as a variable coupling agent.

The invention is broadly directed to a control circuit for electromagnetic couplings including clutches and brakes, the circuit being adapted to provide substantially complete release of such devices when deexcited, insofar as complete release is interfered with by residual magnetism. More specifically, the invention has application to magnetic couplings employing in the gap a magnetic mixture of finely divided magnetic material such as granulated or powdered iron and a lubricant such as oil, grease, powdered graphite or the like. A feature of the invention in this connection is the prevention of the undesired condition of residual solidification of the finely divided magnetic mixture.

Briefly, the invention comprises a switch-controlled clutch exciting circuit and a switch-controlled demagnetizing circuit including a capacitor, the switch means in the demagnetizing circuit being adapted upon opening of the exciting circuit to discharge the capacitor through the field coil of the coupling in a direction opposite to the direction of flow of the exciting current, so as substantially completely to demagnetize the magnetic structural parts of the coupling and also to demagnetize the finely divided magnetic mixture in the magnetic gap. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which one of various possible embodiments of the invention is illustrated, Fig. 1 is a diagrammatic view of an exemplary coupling adapted to be controlled by use of this invention;

Similar reference characters indicate corresponding parts throughout the several views of the drawings.

Figure 1:
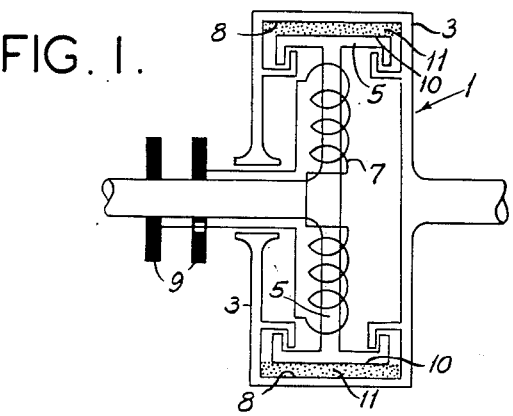

Referring to Fig. 1, there is shown diagrammatically a magnetic clutch 1 of the magnetic fluid type. The clutch comprises a magnetic field member 3 and a relatively rotary magnetic inductor member 5. One of the relatively rotary members 3 and 5 constitutes the driving element of a clutch and the other rotary member constitutes the driven element. The field member 3 is wound with a field coil 7 which is supplied with direct current through brushes 9. Members 3 and 5 have spaced faces 8 and 10 defining a gap across which extends the magnetic field. This gap is filled with finely divided magnetic particles 11.

When a magnetic field is established between the two members 1 and 3, the magnetic mixture stiffens and tends to bind the two rotary members 3 and 5 against relative rotation. At full excitation the stiffness may be sufficient to provide a synchronous drive. Thus the clutch may be positively engaged. When the field coil is deenergized, the more or less rigid form of the magnetic particles tends to break up and permits relative rotation of rotary members 1 and 3. Further details of this type of magnetic coupling are set forth in Technical Report 1213 issued by the National Bureau of Standards. In this connection, see also U. S. Patents 2,519,449; 2,525,571; and 2,575,360. As pointed out in this report and in these patents, when a portion of the flowable magnetic mixture is acted upon by a magnetic field, the magnetic particles are mutually attracted, and bind together in the field, and the mixture tends to solidify or stiffen. This type of clutch has the disadvantage of continuing to transmit some torque after the field coil has been deenergized because the magnetic particles do not readily break up upon deenergization of the field coil but will tend to remain in a relatively solid mass, believed to be due at least in part to residual magnetism.

Figure 2:
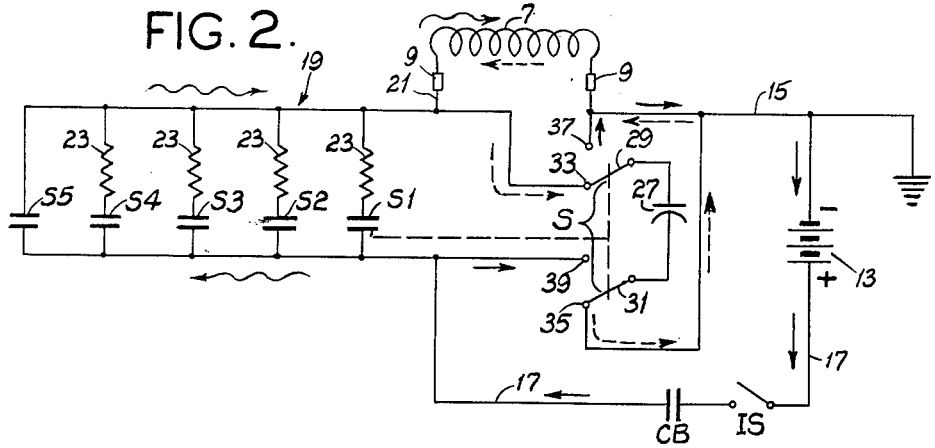
Fig. 2 is a circuit diagram of the control.

Referring now to Fig. 2 of the drawings, there is shown a control circuit of this invention, broadly comprising a source of direct current, a switch-controlled exciting circuit for connecting the source of direct current to the field coil to provide for flow of current through the field coil in a predetermined direction and a switch-controlled demagnetizing circuit for discharging a capacitor through the field coil in a direction opposite to the normal flow of exciting current when the exciting current is cut off.

The D. C. source may be a battery 13 having its negative pole connected by a lead 15 to one of the brushes 9 of the coupling. A lead 17 connects the positive pole of the battery with one side of a current modulating device, generally designated 19. The other side of the current modulating device is connected at 21 to the other brush 9 of the coupling. Where the control is adapted for automotive use, a normally closed circuit breaker CB and a switch IS, which is closed with operation of the ignition switch of a vehicle served by the circuit, are included in the conductor 17.

The current modulating device may be any suitable means for varying the current to the field coil, and is shown as comprising a plurality of parallel-connected switch-controlled resistance branches. Each branch has a resistor element 23 and a normally open switch or contact means, the switches for the various resistance branches being designated S1, S2, S3 and S4. A normally open switch S5 is connected to short out all the resistance. The switches are successively closed beginning with switch S1 by a suitable controller described below. As the switches are successively closed, resistance between the battery and field coil is progressively reduced, thereby increasing the excitation of the field coil 7.

The demagnetizing circuit comprises a relatively large capacitor 27 and a double-throw double-pole transfer switch S for alternatively connecting the capacitor in series with the battery 13 or in series with the field coil 7. The capacitor 27 is connected between the two movable common contacts 29 and 31 of the switch S and these contacts normally close upon a pair of back contacts 33 and 35, respectively. The back contacts 33 and 35 are connected respectively to the junction 21 and to the negative lead 15. The movable contacts 29 and 31 also close upon front contacts 37 and 39, respectively. These front contacts 37 and 39 are connected respectively to the negative and positive leads 15 and 17 from the battery. It will be noticed that the demagnetizing circuit is such that the capacitor is charged in one direction (indicated by solid arrows) and that it discharges in an opposite direction (indicated by the dotted arrow) through the field coil in a direction opposite to the direction of flow of the exciting current. The exciting current is indicated by solid wavy arrows.

Figure 3:
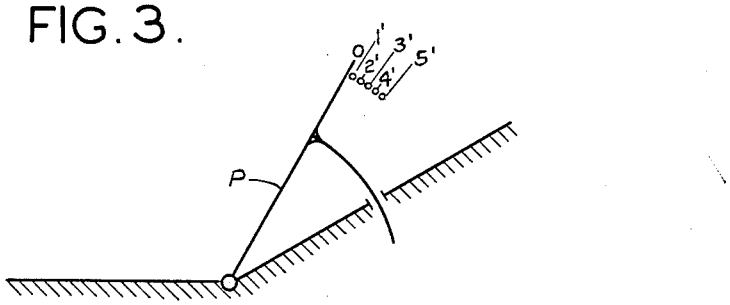
Fig. 3 is a view illustrating certain features of the invention as adapted for an automotive clutch.

A controller is provided for actuating the switches S, S1, S2, S4 and S5 in the proper sequence. If the control is adapted for automotive use, this controller may be connected to the throttle or accelerator pedal of the automobile. Such an arrangement is diagrammatically shown in Fig. 3. The accelerator pedal P is movable from an initial position 0 progressively through various positions designated 1' through 5'. Movement through all of the positions 0 through 5' takes up only a portion of the total movement of the pedal, the other portion being reserved for varying the throttle of the engine. Initially the engine throttle is gradually opened and the switches are actuated in sequence until position 5' is reached. The engine is then operating at a relatively slow speed, for example 800 to 1000 r. p. m., and the clutch becomes completely excited and engaged. As the accelerator pedal is depressed beyond position 5', only the throttle setting is effected. The controller is adapted to actuate switches S and S1 substantially simultaneously, or at least with switch S being actuated immediately before operation of switch S1. Switch S2 is actuated when the controller is moved to position 2', et cetera. Switch actuation may be by mechanical tripping or by relay, means for accomplishing such switch actuation being well-known in the art and requiring no further description.

Operation is as follows: Initially, the circuit breaker CB is closed and the ignition switch IS is open. The common contacts 29 and 31 of switch S are closed upon the back contacts 33 and 35, thus connecting the capacitor 27 in series with the field coil 7. All other switches are open and capacitor 27 is uncharged. When the ignition switch IS is closed the device is ready to operate.

When the controller is moved from position 0 to position 1', switch S is actuated to disconnect the capacitor 27 from the field coil and connect the capacitor in series with the battery 13. The movable contacts 29 and 31 close upon the front contacts 37 and 39 and provide for charging of the capacitor. Also, switch S1 is closed to complete a circuit for clockwise flow of a minimum exciting current to the field coil (solid arrows). As the controller proceeds toward position 5', resistance in the exciting circuit is reduced and ultimately cut out so that the coil is then fully excited. In this condition of full excitation, the finely divided magnetic material 11 between the inductor member 3 and field member 5 assume the form of a relatively rigid mass providing full engagement of the clutch. The modulation of the exciting current provides a smooth transfer from clutch-released to clutch-engaged conditions with the mixture 11 gradually stiffening. The driven member of the clutch may also be operated at a slip speed below the minimum speed of the driving member or engine by partially exciting the field coil, in which event the magnetic material becomes semisolid in degrees according to the excitation.

When it is desired to release the clutch, the controller is moved back to the 0 position. The exciting current is reduced upon opening of switches S5, S4, S3 and S2 and finally cut off by opening of switch S1 at the 0 position of the controller. As switch S1 opens, switch S is simultaneously actuated to cause movable contacts 29 and 31 to transfer from the front contacts 37 and 39 to the back contacts 33 and 35. Thus, the previously charged capacitor is disconnected from the battery and connected to the field coil. The polarity of the charged capacitor relative to that of the field coil is such as to prevent any tendency for inductive discharge by the latter. Normally, inductive discharge is minimized because of the gradual reduction of the exciting current by the current modulating device 19. But in any event, the capacitor quickly discharges through the field coil in a counterclockwise direction (dotted arrows) opposite to the direction of flow for exciting current (solid arrows). Thus, a coercive magnetizing force is applied to cancel residual magnetism in the iron structural members 3 and 5 of the clutch and in the finely divided magnetic material 11. This coercive magnetizing force is applied immediately upon opening of the exciting circuit.

If the capacitor is sufficiently large, a magnetic field is set up around coil 7 in the opposite direction to the normal field direction, which opposite magnetic field upon collapse will cause the capacitor to be charged in the opposite polarity. In this event, oscillations occur with the oscillations being damped by the resistance of the coil. This condition of operation is ideal, because it results in a gradual reduction in area of the hysteresis loop and thereby insures substantially complete demagnetization of the clutch. It will be understood that a preferred method of demagnetizing a magnetic material is to subject the material to a damped oscillating field which is gradually reduced in strength. That is, the material is repeatedly taken through the hysteresis loop with a gradual lessening of the loop area.

The required size of the capacitor can be readily determined for any size of magnetic circuit or clutch and for any size of clutch coil. The capacitor should generally be between 1000 and 6000 microfarads for an automotive clutch. The larger the capacitor is, the lower is the frequency of oscillation, which slows down clutch release. Too low a frequency of oscillation may also result in jerky operation of the clutch.

From the above it is apparent that the control provides complete release of the clutch. Also, the control is particularly adapted for the magnetic fluid type of clutch because it prevents residual magnetism from maintaining the magnetic material in the non-liquid phase after the clutch has been deenergized. While the invention is described in relation to a clutch, it will be understood it has application to electromagnetic brakes, dynamometers and the like. The term coupling as used herein is intended to be generic to clutches and brakes. It should also be understood that although the invention is described in connection with a magnetic fluid type of electric clutch, it is also applicable to electric clutches in general which employ a field coil. For example, eddy-current clutches such as shown in Patents 1,982,461, 2,286,777 and Reissue 22,432 may be usefully served by the present control circuit.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

A control for an electromagnetic coupling having a field coil, the control comprising a source of direct current, an exciting circuit connecting the source of direct current with the field coil, a capacitor and a transfer switch, the transfer switch being adapted to connect the capacitor to the source of direct current for charging when the exciting circuit is closed, and to connect the capacitor to the field coil for discharge therethrough when the exciting circuit is interrupted, and a current modulator connected in said exciting circuit, the current modulator comprising a plurality of resistance elements, each resistance element having normally open contact means associated therewith, means for sequentially operating said contact means to close the exciting circuit with a maximum resistance initially connected therein and progressively to reduce the amount of said resistance, and control means correlating the operation of the current modulator contact means with the actuation of the transfer switch progressively to open said contact means prior to connection of the capacitor with the field coil.

RALPH L. JAESCHKE.

REFERENCES CITED

The following references are of record in the file of this patent:

UNITED STATES PATENTS

| Number | Name | Date |
|---|---|---|
| 721,678 | Douglas | Mar. 31, 1903 |
| 726,536 | Holz | Apr. 28, 1903 |
| 2,445,459 | Snyder | July 20, 1948 |

FOREIGN PATENTS

| Number | Country | Date |
|---|---|---|
| 461,203 | Great Britain | Feb. 12, 1937 |